(12) United States Patent
McCue (10) Patent No.: US 9,271,542 B2
(45) Date of Patent: Mar. 1, 2016

(54) APPARATUS FOR DAMPING AN APPLIED FORCE

(71) Applicant: Geoff McCue, Lawrence, KS (US)

(72) Inventor: Geoff McCue, Lawrence, KS (US)

(*) Notice: Subject to any disclaimer, the term of this patent is extended or adjusted under 35 U.S.C. 154(b) by 683 days.

(21) Appl. No.: 13/662,374

(22) Filed: Oct. 26, 2012

(65) Prior Publication Data

US 2014/0115920 A1 May 1, 2014

(51) Int. Cl.
*B32B 1/00* (2006.01)
*B32B 3/00* (2006.01)
*A43B 13/18* (2006.01)
*F16F 3/087* (2006.01)

(52) U.S. Cl.
CPC .............. *A43B 13/18* (2013.01); *A43B 13/181* (2013.01); *F16F 3/0873* (2013.01)

(58) Field of Classification Search
CPC ....... A43B 13/18; A43B 13/181; F16F 3/087; F16F 1/36; F16F 7/00; B32B 1/00; B32B 3/00; B32B 3/08; B32B 3/085; B32B 3/10; B32B 3/18; B32B 3/20; B32B 3/22
USPC ......... 428/166, 174, 178; 36/27, 28; 248/562; 267/145, 151, 152, 153
See application file for complete search history.

(56) References Cited

U.S. PATENT DOCUMENTS

| | | | |
|---|---|---|---|
| 4,535,553 A | 8/1985 | Derderian | |
| 4,753,021 A | 6/1988 | Cohen | |
| 4,766,681 A | 8/1988 | O'Rourke | |
| 4,774,774 A | 10/1988 | Allen, Jr. | |
| 5,337,492 A | 8/1994 | Anderie | |
| 5,710,396 A * | 1/1998 | Rogers | 181/208 |
| 5,822,886 A | 10/1998 | Luthi | |
| 6,763,611 B1 | 7/2004 | Fusco | |
| 6,983,555 B2 | 1/2006 | Lacorazza | |
| 7,108,252 B2 | 9/2006 | Jayakumaran | |
| 7,401,418 B2 | 7/2008 | Wyszynski | |
| 7,992,324 B2 | 8/2011 | Lacorazza | |
| 8,056,263 B2 | 11/2011 | Schindler | |
| 2004/0237343 A1 | 12/2004 | Herman | |

* cited by examiner

*Primary Examiner* — Catherine A Simone
(74) *Attorney, Agent, or Firm* — Christina Chamberlain; Chamberlain Legal Services, PLLC (57) ABSTRACT

An apparatus comprises a first portion comprising a generally flexible material formed in a generally planar rectangular shape. A second portion comprises the generally flexible material formed in the generally planar rectangular shape. The first portion and the second portion are joined to form a V-shaped structure. The first portion and the second portion are configured to be joinable to a surface of at least one structure for damping an applied external force.

22 Claims, 11 Drawing Sheets

APPARATUS FOR DAMPING AN APPLIED FORCE

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to dampers. More particularly, one or more embodiments of the invention relate to substantially V-shaped dampers.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a shock absorber is a mechanical device designed to smooth out or damp shock impulse, and dissipate kinetic energy.

Typically, shock absorbers are an important part of automobile and motorcycle suspensions, aircraft landing gear, footwear, safety wearable, and the supports for many industrial machines. Large shock absorbers have also been used in structural engineering to reduce the susceptibility of structures to earthquake damage and resonance.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A, 1B, 1C, and 1D illustrate end views of a substantially V-shaped damper, in accordance with an embodiment of the present invention, where

FIGS. 2A, 2B, and 2C illustrate side views of a series of exemplary dampers joined to a single layer or sandwiched between an exemplary plurality of layers and conforming to various orientations and positions, in accordance with an embodiment, of the present invention where

FIGS. 3A, 3B, and 3C illustrate end views of an exemplary damper comprising different dimensions and configurations, in accordance with an embodiment of the present invention, where

FIGS. 4A, 4B, and 4C illustrate end views of an exemplary damper comprising differently sized and dimensioned bottom portions, in accordance with an embodiment of the present invention, where

FIGS. 5A and 5B illustrate side views of an exemplary series of dampers positioned between an exemplary plurality of layers, in accordance with an embodiment of the present invention, where FIG. 5A illustrates a side view of an exemplary series of dampers positioned between an exemplary plurality of layers.

FIGS. 6A and 6B illustrate detailed perspective views of an exemplary damper with and without a segment portion positioned between an exemplary plurality of layers, in accordance with an embodiment of the present invention, where

FIGS. 7A, 7B, 7C, and 7D illustrate side views of an exemplary damper comprising differently sized and configured segment portions, in accordance with an embodiment of the present invention, where

FIGS. 8A, 8B, and 8C illustrate detailed perspective views of an exemplary damper device with exemplary dampers in series configured differently, in accordance with an embodiment of the present invention, where

FIGS. 9A, 9B, 9C, and 9D illustrate sectioned views of an exemplary damper device utilized in a shoe, in accordance with an embodiment of the present invention, where FIGS. 10A, 10B, and 10C illustrate detailed perspective views of an exemplary damper device utilized in different objects, in accordance with an embodiment of the present invention, where

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of damper devices that may be provided by preferred embodiments of the present invention. In one embodiment of the present invention, the damper device may provide a substantially V-shaped damper positioned on a single layer or between a plurality of shock absorbing materials for damping shock impulse, and dissipating kinetic energy. The V-shape of the damper may allow air to circulate throughout the damping device and the object that the damping device joins. The damping device may further be efficacious in providing resistance to compressive and flexible forces. The plurality of layers may include two shock absorbing materials that overlay two opposite ends of the damper. The damper may function independently, or position adjacently to another damper for reinforcement. In some embodiments, a series of dampers may align adjacent to each other. In some embodiments, the damper device may provide damping functions to numerous objects and machinery that receive stress or force, including, without limitation, a shoe, a shin guard, a helmet, a tire, a vehicle strut, a gear mechanism, and a bed. Suitable materials for the damper device may include, without limitation, polymers, polyurethanes, dense foams, rubber, carbon fiber composites and durable, flexible materials. These materials may be used individually, laminated or combined to achieve the most efficient dampening.

In one embodiment of the present invention, the damper device may include a series of dampers positioned adjacently, and sandwiched between two layers of shock absorbing material. The damper device may conform to a plurality of positions including, without limitation, a concave shape, a convex shape, an inverted shape, and a wave shape. The damper device may form a contour to conform to any orientation or direction a force may be applied. The damper device may further include an inverted V-shape. Those skilled in the art, in light of the present teachings will recognize that the damper device may be flexible enough to squeeze into tight spaces, and have sufficient tensile strength to stretch along the longitudinal axis of longer objects.

In one embodiment of the present invention, the substantially V-shaped damper may include various dimensions and orientations. The damper may include a height. The height may be tailored to position between each layer. Those skilled in the art, in light of the present teachings will recognize that a damper with a greater height may provide additional surface area to damp shock impulses, and dissipate kinetic energy. However, the stiffness of the damper material, and the angle of the substantially V-shape may also contribute to the efficacy of the shock absorbance. In some embodiments, the damper may include a thickness. The thickness may change as forces compress and expand the damper. In some embodiments, the damper may further include a gap width. The gap width may include a termination point where the damper tapers outward, and where the damper is at a widest point. In some embodiments, the damper may include a top portion that extends outwardly to provide additional height to the damper. In some embodiments, the damper may include an extension portion that joins with the top portion, thereby providing additional height. The extension portion may be detachable. Those skilled in the art, in light of the present teachings will recognize that extending the top portion may allow the damper device to be utilized in additional objects. In some embodiments, the damper may include a segment portion that forms a gap along the side of the damper. The segment portion may be flexed and/or shaped to fit varying contours to mitigate distortion.

Figures 1A, 1B:
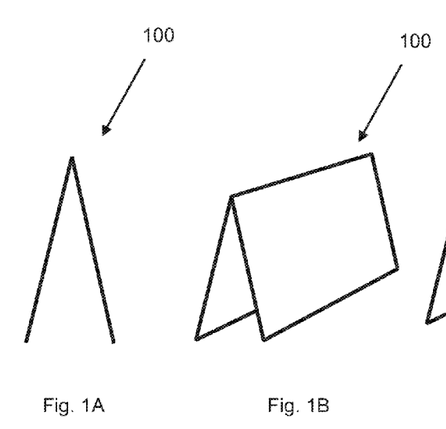
FIG. 1A illustrates an end view of an exemplary damper.
FIG. 1B illustrates a detailed perspective end view of an exemplary damper.
Figure 1C:
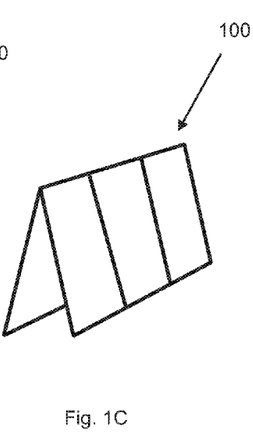
FIG. 1C illustrates a detailed perspective end view of a series of exemplary dampers.
Figure 1D:
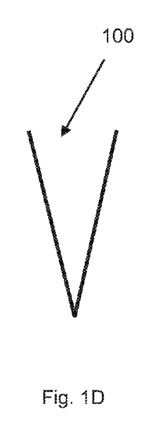
FIG. 1D illustrates an end view of an exemplary inverted damper.

FIGS. 1A, 1B, 1C, and 1D illustrate end views of a substantially V-shaped damper, in accordance with an embodiment of the present invention, where FIG. 1A illustrates an end view of an exemplary damper, FIG. 1B illustrates a detailed perspective end view of an exemplary damper, FIG. 1C illustrates a detailed perspective end view of a series of exemplary dampers, and FIG. 1D illustrates an end view of an exemplary inverted damper. In the present embodiment, the damper device may provide a substantially V-shaped damper 100 positioned between a plurality of shock absorbing materials for damping shock impulse, and dissipating kinetic energy. The V-shape may allow air to circulate throughout the damping device and the object that the damping device joins. In one alternative embodiment, the damper may include, without limitation, a substantially U-shape, a parallel shape, a tapered shape, or a cone shape. The damper device may further be efficacious in providing resistance to compressive and flexible forces. The plurality of layers that overlay the dampers may include two shock absorbing materials that overlay two opposite ends of the damper. The damper may function independently, or position adjacently to another damper for reinforcement. In some embodiments, a series of dampers may align adjacent to each other. In some embodiments, the damper device may provide damping functions to numerous objects and machinery that receive stress or force, including, without limitation, a shoe, a shin guard, a helmet, a tire, a vehicle strut, a gear mechanism, and a bed. Suitable materials for the damper device may include, without limitation, polymers, polyurethanes, dense foams, rubber, carbon fiber composites and durable, flexible materials. These materials may be used individually, laminated or combined to achieve the most efficient dampening.

Figure 2A:
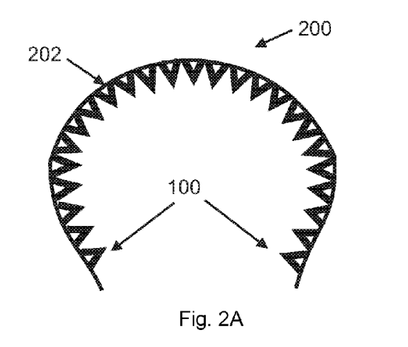
FIG. 2A illustrates a side view of an exemplary damper device in a convex shape.
Figure 2B:
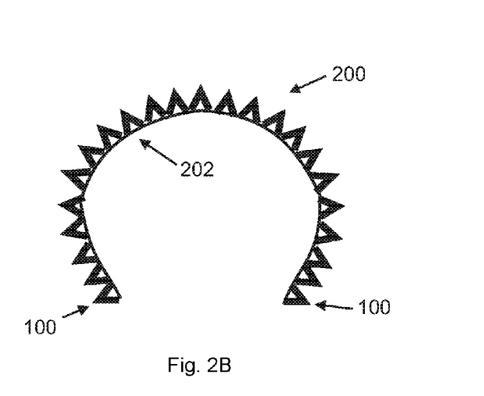
FIG. 2B illustrates a side view of an exemplary damper device in a concave shape.
Figure 2C:
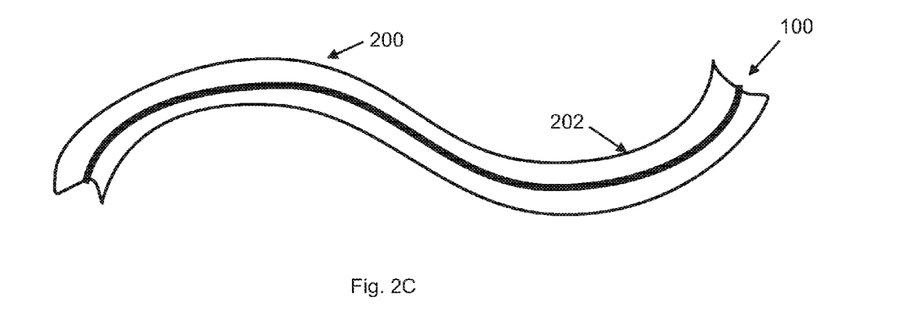
FIG. 2C illustrates a side view of an exemplary damper device in a wave shape.

FIGS. 2A, 2B, and 2C illustrate side views of a series of exemplary dampers joined to a single layer or sandwiched between an exemplary plurality of layers and conforming to various orientations and positions, in accordance with an embodiment of the present invention, where FIG. 2A illustrates a side view of an exemplary damper device in a convex shape, FIG. 2B illustrates a side view of an exemplary damper device in a concave shape, and FIG. 2C illustrates a side view of an exemplary damper device in a wave shape. In the present embodiment, the damper device 200 may include a series of dampers positioned adjacently, and sandwiched between a plurality of layers 202. The plurality of layers may include, without limitation, two layers of shock absorbing material. The damper device may conform to a plurality of positions including, without limitation, a concave shape, a convex shape, an inverted shape, and a wave shape. The damper device may form a contour to conform to any orientation or direction a force may be applied. The damper device may further include an inverted V-shape. Those skilled in the art, in light of the present teachings will recognize that the damper device may be flexible enough to squeeze into tight spaces, and have sufficient tensile strength to stretch along the longitudinal axis of longer objects.

Figure 3A:
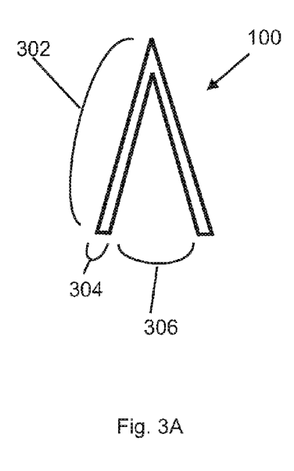
FIG. 3A illustrates a side view of an exemplary damper device comprising a height, thickness, and gap width.
Figure 3B:
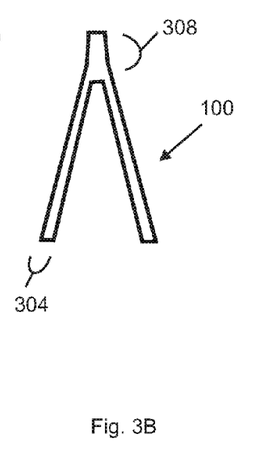
FIG. 3B illustrates a side view of an exemplary damper device comprising a height, thickness, gap width, and a top portion that extends outwardly.
Figure 3C:
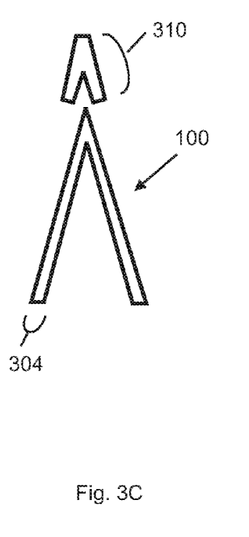
FIG. 3C illustrates a side view of an exemplary damper device comprising a height, thickness, gap width, and an extension portion.

FIGS. 3A, 3B, and 3C illustrate end views of an exemplary damper comprising different dimensions and configurations, in accordance with an embodiment of the present invention, where FIG. 3A illustrates a side view of an exemplary damper device comprising a height, thickness, and gap width, FIG. 3B illustrates a side view of an exemplary damper device comprising a height, thickness, gap width, and a top portion that extends outwardly, and FIG. 3C illustrates a side view of an exemplary damper device comprising a height, thickness, gap width, and an extension portion. FIGS. 3A, 3B, and 3C further illustrate manufacturing alternatives, in accordance with an embodiment of the present invention. In the present embodiment, the substantially V-shaped damper may include various dimensions and orientations. The damper may include a height 302. The height may be tailored to position between each layer. Those skilled in the art, in light of the present teachings will recognize that a damper with a greater height may provide additional surface area to damp shock impulses, and dissipate kinetic energy. However, the stiffness of the damper material, and the angle of the substantially V-shape may also contribute to the efficacy of the shock absorbance. In some embodiments, the damper may include a thickness 304. The thickness may change as forces compress and expand the damper where increased thickness may increase force dampening. In some embodiments, the damper may further include a gap width 306. The gap width may include a termination point where the damper tapers outward, and where the damper is at a widest point. A wider gap width may allow for contouring while mitigating distortion to the dampening elements. Distortion may affect dampening. In some embodiments, the damper may include a top portion 308 that extends outwardly to provide additional height to the damper. In some embodiments, the damper may include an extension portion 310 that joins with the top portion, thereby providing additional height. The extension portion may be detachable. Those skilled in the art, in light of the present teachings will recognize that extending the top portion may allow the damper device to be utilized in additional objects. In some embodiments, the damper may include a segment portion that forms a gap along the side of the damper.

Figure 4A:
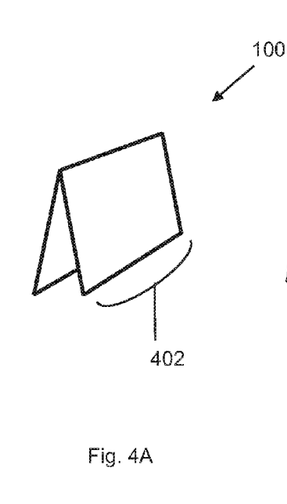
FIG. 4A illustrates a detailed perspective view of an exemplary damper device comprising a straight bottom portion.
Figure 4B:
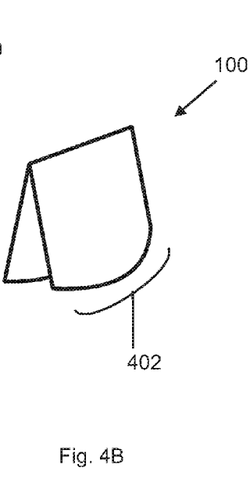
FIG. 4B illustrates a detailed perspective view of an exemplary damper device comprising a round bottom portion.
Figure 4C:
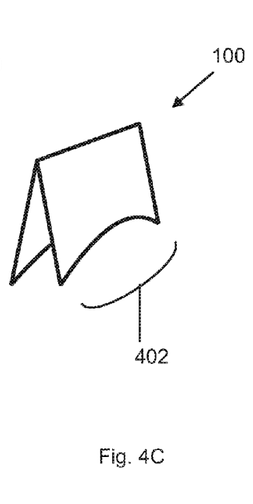
FIG. 4C illustrates a detailed perspective view of an exemplary damper device comprising a convex bottom portion.

FIGS. 4A, 4B, and 4C illustrate end views of an exemplary damper comprising differently sized and shaped bottom portions, in accordance with an embodiment of the present invention, where FIG. 4A illustrates a detailed perspective view of an exemplary damper device comprising a straight bottom portion, FIG. 4B illustrates a detailed perspective view of an exemplary damper device comprising a round bottom portion, and FIG. 4C illustrates a detailed perspective view of an exemplary damper device comprising a convex bottom portion. In the present embodiment, the damper may include a bottom portion 402 that provides a supporting base and engages the object. The bottom portion may include various shapes and sizes that allow the damper device to join with an eclectic assortment of objects. The differently sized and dimensioned bottom portions may further allow the damper device to join with objects that require both lateral contouring and vertical contouring. For example, without limitation, a shoe with a flat sole may require a straight bottom portion, while a curved helmet may require a concave bottom portion.

Figure 5A:
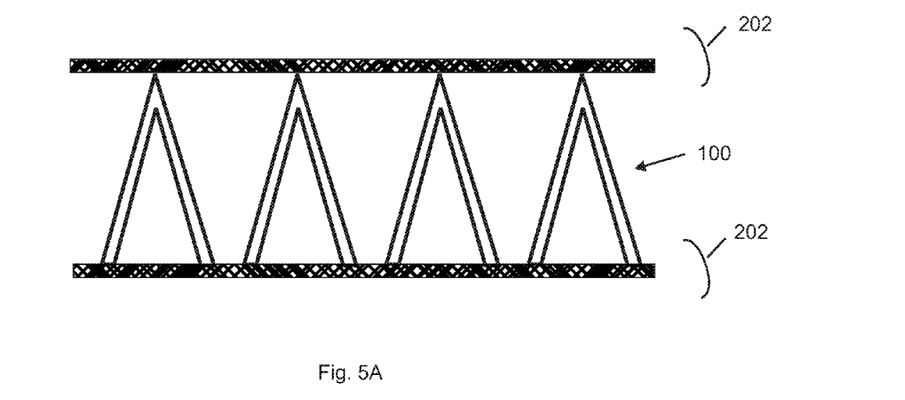
Figure 5B:
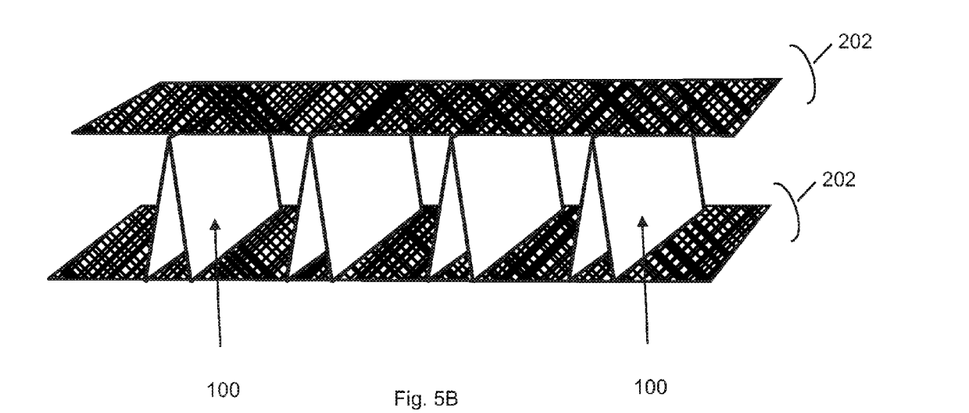
FIG. 5B illustrates a detailed perspective view of an exemplary series of dampers positioned between an exemplary plurality of layers.

FIGS. 5A and 5B illustrate side views of an exemplary series of dampers positioned between an exemplary plurality of layers, in accordance with an embodiment of the present invention, where FIG. 5A illustrates a side view of an exemplary series of dampers positioned between an exemplary plurality of layers, and FIG. 5B illustrates a detailed perspective view of an exemplary series of dampers positioned between an exemplary plurality of layers. In the present embodiment, the plurality of layers may support each damper independently or individually, as required. The plurality of layers may join with the dampers by anchoring, or in a detachable manner. The plurality of layers may include various rigid, semi-rigid, flexible, or semi-flexible materials, including, without limitation, polymers, polyurethanes, dense foams, rubber, carbon fiber composites and durable, flexible materials. In some embodiments, the materials may be woven, manufactured in a sheet form, or manufactured in an open weave construction to allow for varying degrees of flexibility. In one embodiment of the present invention, the substantially V-shape damper device may incorporate into the manufacturing of a shoe.

Figure 6A:
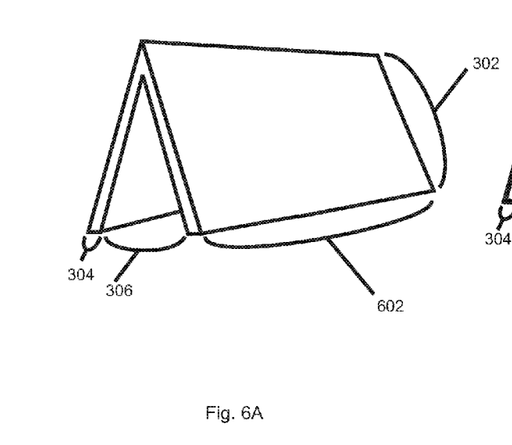
FIG. 6A illustrates a detailed perspective view of an exemplary damper comprising height, length, and thickness.
Figure 6B:
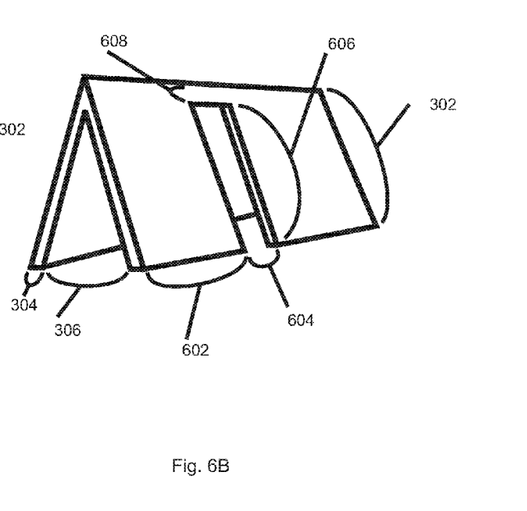
FIG. 6B illustrates a detailed perspective view of an exemplary damper comprising height, length, and thickness, a segment portion, and a segment length.

FIGS. 6A and 6B illustrate detailed perspective views of an exemplary damper with and without a segment portion positioned between an exemplary plurality of layers, in accordance with an embodiment of the present invention, where FIG. 6A illustrates a detailed perspective view of an exemplary damper comprising height, length, and thickness, and FIG. 6B illustrates a detailed perspective view of an exemplary damper comprising height, length, and thickness, a segment portion, and a segment length. In the present embodiment, the damper may include a height, gap width, thickness, and a length 602. The damper may further include a segment portion 604 that forms a gap along the length. The segment portion may include a segment height 606. A segment space 608 may form between the top of the segment portion and the top of the damper. Segmenting may allow for contouring, as in the shoe illustration, for height adjustment along a segment while mitigating distortion or loss of dampening, and for use of laminated or combined materials to improve dampening in specific areas of the application.

Figure 7A:
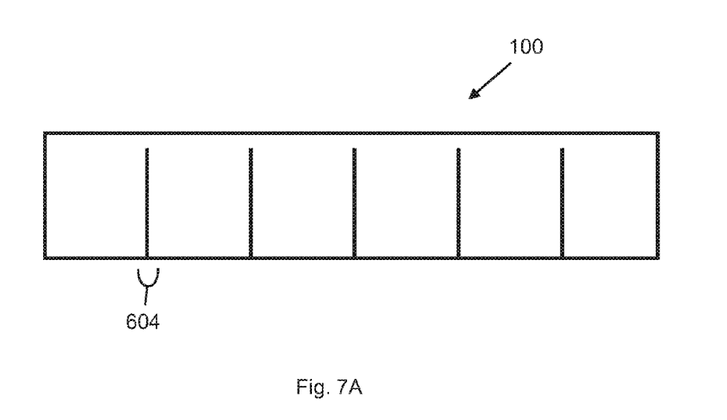
FIG. 7A illustrates a side view of an exemplary damper comprising a narrow gap width.
Figure 7B:
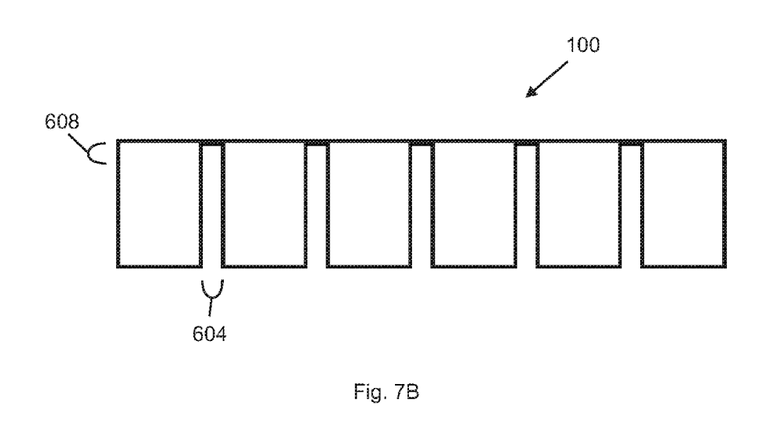
FIG. 7B illustrates a side view of an exemplary damper comprising a wide gap width.
Figure 7C:
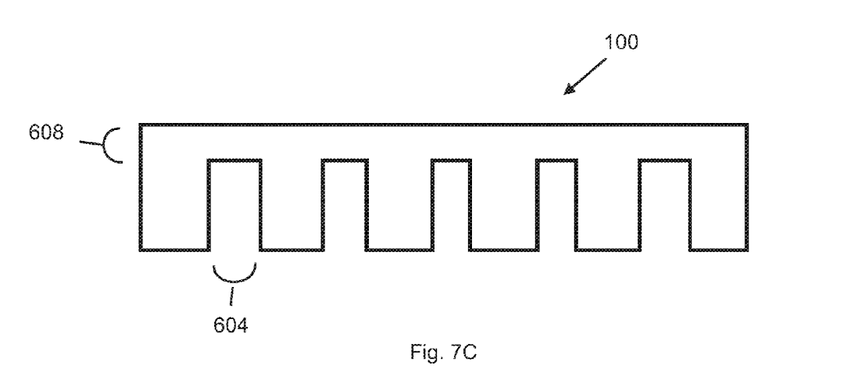
FIG. 7C illustrates a side view of an exemplary damper with a wide gap width and a wide extension portion.
Figure 7D:
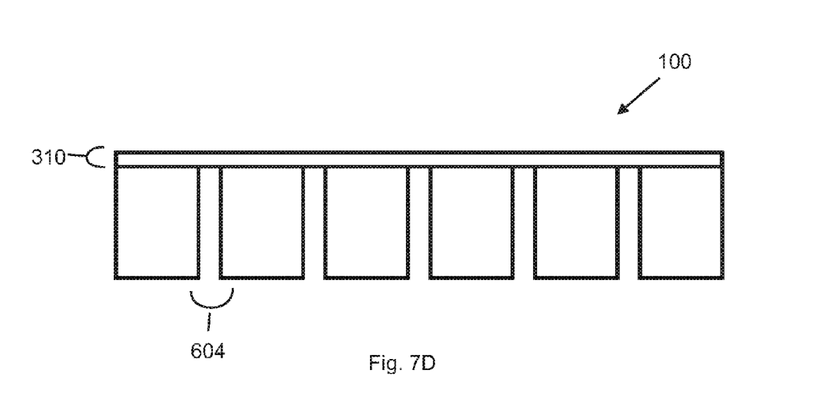
FIG. 7D illustrates a side view of an exemplary damper comprising a top portion that joins each damper.

FIGS. 7A, 7B, 7C, and 7D illustrate side views of an exemplary damper comprising differently sized and configured segment portions, in accordance with an embodiment of the present invention, where FIG. 7A illustrates a side view of an exemplary damper comprising a narrow gap width, FIG. 7B illustrates a side view of an exemplary damper comprising a wide gap width, FIG. 7C illustrates a side view of an exemplary damper with a wide gap width and a wide extension portion, and FIG. 7D illustrates a side view of an exemplary damper comprising a top portion that joins each damper. In the present embodiment, the damper device may include variously sized gap widths and extension portions. The extension portions may join along a longitudinal axis of a series of dampers to secure each damper to an adjacent damper. By varying the size, dimension, and orientation of the gap width and the extension portion, the flexibility and damping capacity of the damping device may be manipulated to a desired function.

Figure 8A:
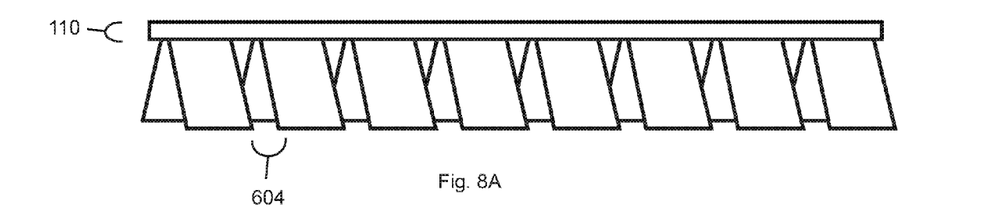
FIG. 8A illustrates a detailed perspective view of an exemplary damper device comprising dampers disposed parallel to each other.
Figure 8B:
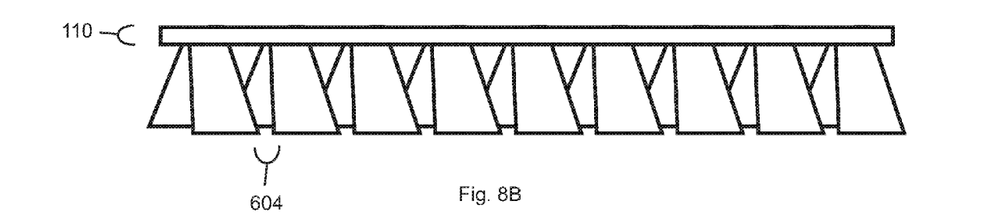
FIG. 8B illustrates a detailed perspective view of an exemplary damper device comprising dampers tapered top to bottom.
Figure 8C:
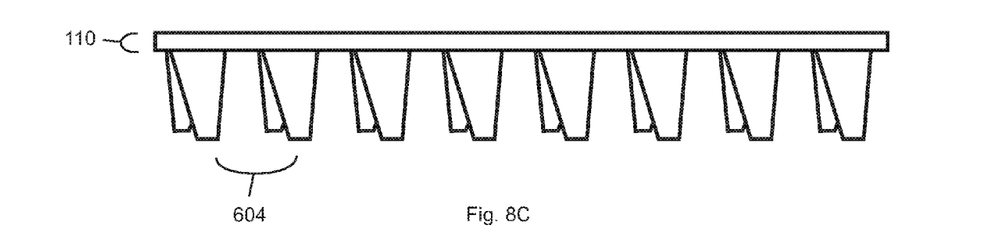
FIG. 8C illustrates a detailed perspective view of an exemplary damper device comprising dampers tapered bottom to top.

FIGS. 8A, 8B, and 8C illustrate detailed perspective views of an exemplary damper device with exemplary dampers in series configured differently, in accordance with an embodiment of the present invention, where FIG. 8A illustrates a detailed perspective view of an exemplary damper device comprising dampers disposed parallel to each other, FIG. 8B illustrates a detailed perspective view of an exemplary damper device comprising dampers tapered top to bottom, and FIG. 8C illustrates a detailed perspective view of an exemplary damper device comprising dampers tapered bottom to top. In the present embodiment, varying the angle of the V-shape may provide different damping capacity, and allow the damping device to fit in different objects. With an increase in the bottom as in FIG. 8b, one may effectively bend the segment in a concave shape without loss of damper or distortion. Also, as in FIG. 8c, one may do likewise with a convex curve, allowing the tapered ends to bend while not touching or distorting.

Figure 9A:
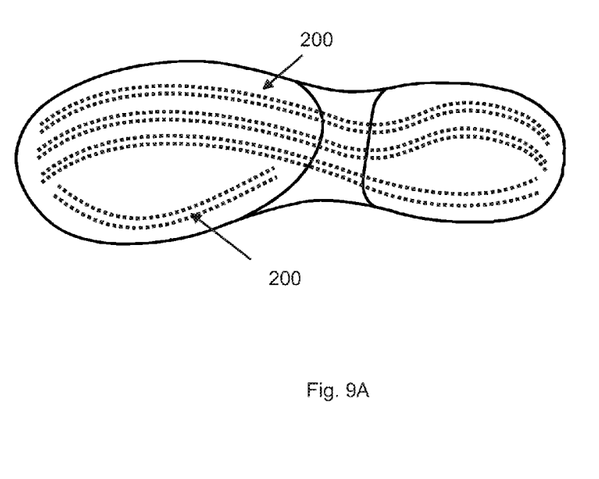
FIG. 9A illustrates a sectioned bottom view of an exemplary damper device positioned along a longitudinal axis of the shoe.
Figure 9B:
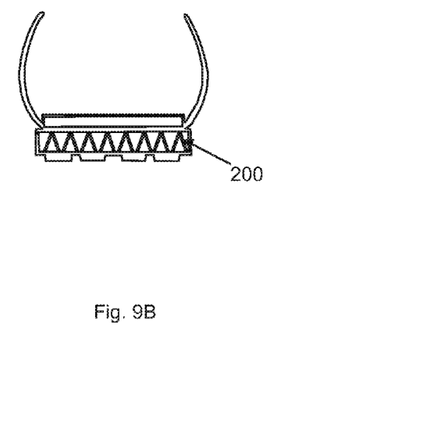
FIG. 9B illustrates a sectioned side view of an exemplary damper device comprising a substantially V-shaped configuration.
Figure 9C:
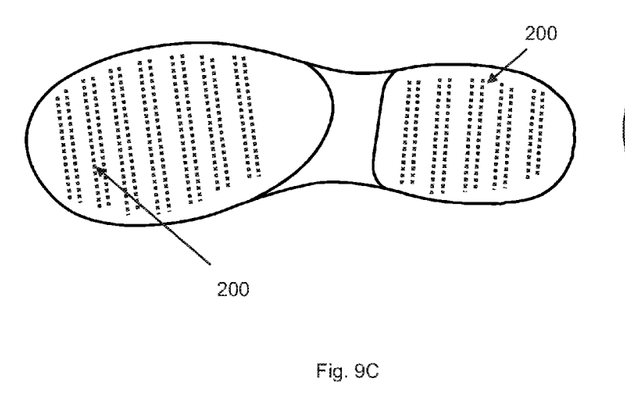
FIG. 9C illustrates a sectioned bottom view of an exemplary damper device positioned along a latitudinal axis of the shoe.
Figure 9D:
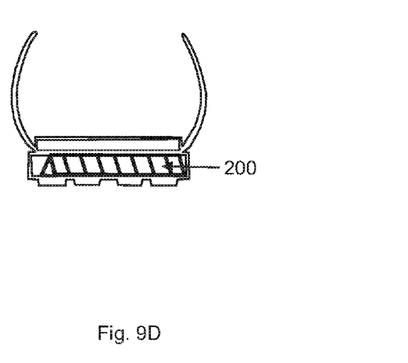
FIG. 9D illustrates a sectioned side view of an exemplary damper device comprising a substantially parallel configuration.

FIGS. 9A, 9B, 9C, and 9D illustrate sectioned views of an exemplary damper device utilized in a shoe, in accordance with an embodiment of the present invention, where FIG. 9A illustrates a sectioned bottom view of an exemplary damper device positioned along a longitudinal axis of the shoe, FIG. 9B illustrates a sectioned side view of an exemplary damper device comprising a substantially V-shaped configuration, FIG. 9C illustrates a sectioned bottom view of an exemplary damper device positioned along a latitudinal axis of the shoe, and FIG. 9D illustrates a sectioned side view of an exemplary damper device comprising a substantially parallel configuration. In the present embodiment, the orientation of the damping device in a shoe may be tailored to accommodate different shoes with different functions. For example, without limitation, a dress shoe may require a damping device along the longitudinal axis of the shoe for simple walking, while a basketball shoe may require the damping device to orient both along a longitudinal axis and along a latitudinal axis to account for lateral movements that are required while playing basketball. In some embodiments, the damper may be curved, convex, and concave to provide various types of damping capacity.

Figure 10A:
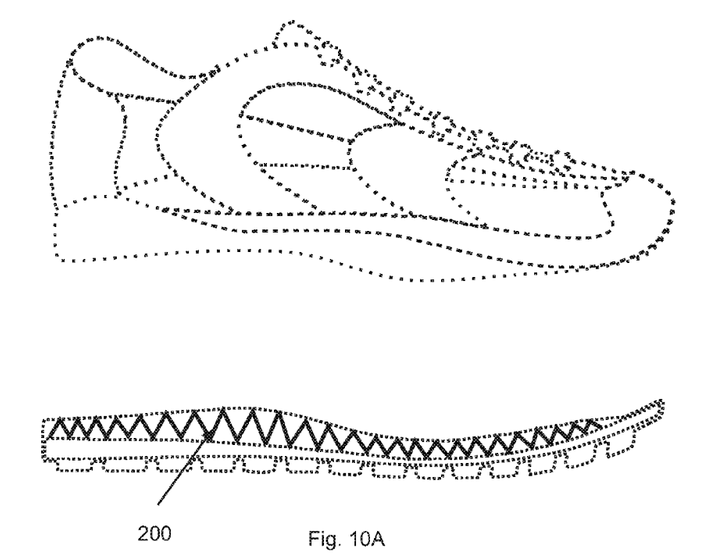
FIG. 10A illustrates a detailed perspective view of an exemplary damper device utilized in a shoe.
Figure 10B:
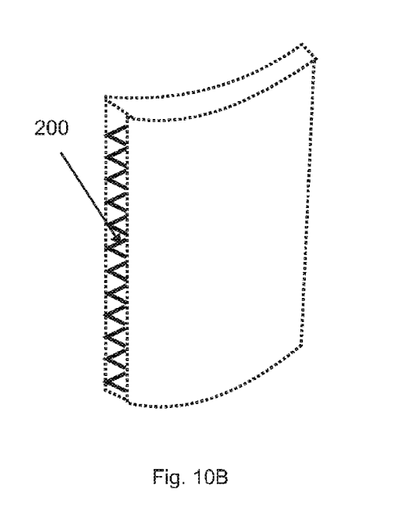
FIG. 10B illustrates a detailed perspective view of an exemplary damper device utilized in a shin guard.
Figure 10C:
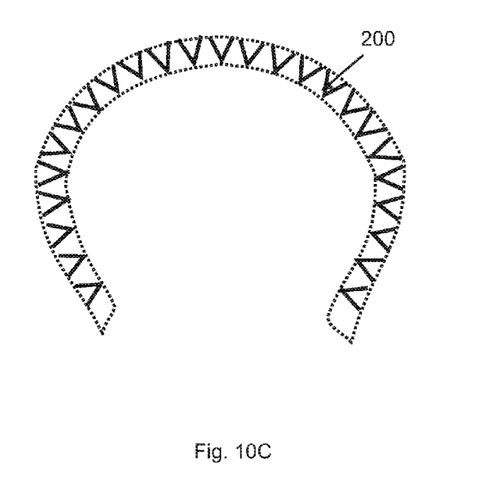
FIG. 10C illustrates a detailed perspective view of an exemplary damper device utilized in a helmet.

FIGS. 10A, 10B, and 10C illustrate detailed perspective views of an exemplary damper device utilized in different objects, in accordance with an embodiment of the present invention, where FIG. 10A illustrates a detailed perspective view of an exemplary damper device utilized in a shoe, FIG. 10B illustrates a detailed perspective view of an exemplary damper device utilized in a shin guard, and FIG. 10C illustrates a detailed perspective view of an exemplary damper device utilized in a helmet. In the present embodiment, the damper device may provide damping functions to numerous objects and machinery that receive stress or force, including, without limitation, a shoe, a shin guard, a helmet, a tire, a vehicle strut, a gear mechanism, and a bed. Those skilled in the art, in light of the present teachings will recognize that the damper device comprises sufficient flexibility, whereby varying the size, dimensions, and orientations may allow the damper device to position into an eclectic assortment of objects.

In one alternative embodiment of the present invention, the damping device may position inside a box used for shipping fragile items. In this manner, the objects may receive additional cushioning during travel. In yet another alternative embodiment, the damping device may be fabricated into one large piece, and provide a shock absorber for a vehicle. In yet another alternative embodiment, a plurality of damping devices may be stacked to reinforce each other. In yet another alternative embodiment, the substantially V-shape of the damper may be utilized to reinforce a building against shocks from an earthquake. The height, gap width, thickness, and length may be manipulated to position between layers of a wall.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing a substantially V-shaped damping device that comprises sufficient flexibility and durability to contour an eclectic assortment of objects according to the present invention will be apparent to those skilled in the art. Various aspects of the invention have been described above by way of illustration, and the specific embodiments disclosed are not intended to limit the invention to the particular forms disclosed. The particular implementation of the substantially V-shaped damping device that comprises sufficient flexibility and durability to contour an eclectic assortment of objects may vary depending upon the particular context or application. By way of example, and not limitation, the substantially V-shaped damping device that comprises sufficient flexibility and durability to contour an eclectic assortment of objects described in the foregoing were principally directed to a substantially V-shaped damping device that comprises sufficient flexibility and durability to contour an eclectic assortment of objects, and includes various dimensions and configurations implementations; however, similar techniques may instead be applied to packaging materials to protect mailed items from damage, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:
   a first portion with a top end and bottom end comprising a generally flexible material formed in a generally planar rectangular shape; and
   a second portion with a top end and a bottom end comprising said generally flexible material formed in said generally planar rectangular shape, said first portion and said second portion being joined along the top end of the first and second portion to form a V-shaped structure with a top and bottom edge, said first portion and said second portion being configured to be joinable at the bottom edge of the V-shaped structure to a surface of at least one structure for damping an applied external force;
   a segment portion with a top and bottom end positioned between the V-shaped structure that forms a width along the length of the bottom edge of the V-shaped structure; and
   a segment space that is formed between the top end of the segment portion and the top edge of the V-shaped structure.

2. The apparatus as recited in claim 1, in which said V-shaped structure is further configured to be joinable to the surface of the at least one structure to be adjacent to at least one additional V-shaped structure.

3. The apparatus as recited in claim 1, in which the bottom ends of said first portion and said second portion are contoured to match the contour of said at least one surface.

4. The apparatus as recited in claim 1, in which the width of the segmented portion of said first portion and said second portion increases towards the bottom edge of the V-shaped structure, or the top edge of the V-shaped structure for contouring to a concave surface.

5. The apparatus as recited in claim 1, in which the width of a segmented portion of said first portion and said second portion decreases towards the bottom edge of the V-shaped structure, or the top edge of the V-shaped structure for contouring to a convex surface.

6. The apparatus as recited in claim 1, in which said first portion and said second portion are configured to be joinable at the top edge of the V-shaped structure to a surface of an additional structure to form a type of sandwich structure.

7. The apparatus as recited in claim 6, in which the width of a segmented portion of said first portion and said second portion increases or decreases towards the bottom edge of the V-shaped structure, or the top edge of the V-shaped structure to enable contouring between said at least one structure and said additional structure.

8. The apparatus as recited in claim 6, in which said sandwich structure further comprises a plurality of additional V-shaped structures.

9. The apparatus as recited in claim 8, in which heights of said V-shaped structures varies to match contours of said at least one structure and said additional structure.

10. A system comprising:
    a plurality of first portions each comprising a generally flexible material formed in a generally rectangular shape having a height, a width having a top edge and a bottom edge, and a thickness; and
    a plurality of second portions each comprising said generally flexible material formed in said generally rectangular shape having said height, said width having a top edge and a bottom edge, and said thickness, said first portions and said second portions being joined along said top edges to form a plurality of V-shaped structures;
    a plurality of segment portions with a top and bottom end positioned between each V-shaped structure that forms a width along the length of the bottom edge of the V-shaped structure;
    a plurality of segment spaces that is formed between the top end of the segment portion and the top edge of each V-shaped structure;
    a first surface of a first structure being joinable to said top edges; and
    a second surface of a second structure being joinable to said bottom edges for forming a sandwich structure for damping external forces applied to said sandwich structure.

11. The system as recited in claim 10, in which said bottom edges of said first portion and second portion are contoured to match the contour of said second surface.

12. The system as recited in claim 10, in which widths of segmented portions of said first portions and said second portions increase towards the bottom edge of the V-shaped structure, or the top edge of the V-shaped structure for contouring to a concave surface of said second surface.

13. The system as recited in claim 10, in which the widths of a segmented portions of said first portions and said second portions decrease towards the bottom edge of the V-shaped structure, or the top edge of the V-shaped structure for contouring to a convex surface of said second surface.

14. The system as recited in claim 10, in which heights of said V-shaped structures varies to match contours of said first surface and said second surface.

15. The system as recited in claim 10, in which air flows between said first surface and said second surface.

16. The system as recited in claim 10, in which V-shaped structures are orientated adjacently.

17. The system as recited in claim 10, in which said sandwich structure is configured for use in a sole of a shoe.

18. An apparatus comprising:
    a first portion with a top end and bottom end comprising a generally flexible material formed in a generally planar rectangular shape; and
    a second portion with a top end and a bottom end comprising said generally flexible material formed in said generally planar rectangular shape, said first portion and said second portion being joined along the top end of the first and second portion to form a V-shaped structure with a top and bottom edge, said first portion and said second portion being configured to be joinable at the bottom edge of the V-shaped structure to a surface of at least one structure for damping an applied external force; and
wherein the bottom ends of said first portion and said second portion are contoured to match the contour of said at least one surface.

19. The apparatus as recited in claim 18, in which said V-shaped structure is further configured to be joinable to the surface of the at least one structure to be adjacent to at least one additional V-shaped structure.

20. The apparatus as recited in claim 18, in which said first portion and said second portion are configured to be joinable at the top edge of the V-shaped structure to a surface of an additional structure to form a type of sandwich structure.

21. The apparatus as recited in claim 20, in which said sandwich structure further comprises a plurality of additional V-shaped structures.

22. The apparatus as recited in claim 21, in which heights of said V-shaped structures varies to match contours of said at least one structure and said additional structure.

* * * * *